United States Patent [19]
Dietz et al.

[11] Patent Number: 5,988,143
[45] Date of Patent: Nov. 23, 1999

[54] PROCESS FOR DETERMINING THE OPENING TIME OF AN INJECTION VALVE OF A COMMON-RAIL INJECTION SYSTEM

[75] Inventors: Martin Dietz; Bernd Lindemann, both of Stuttgart; Erhard Steffen, Waiblingen, all of Germany

[73] Assignee: DaimlerChrysler AG, Germany

[21] Appl. No.: 09/079,391

[22] Filed: May 15, 1998

[30] Foreign Application Priority Data

May 15, 1997 [DE] Germany ............................ 197 20 378

[51] Int. Cl.$^6$ .................................................. F02M 37/04
[52] U.S. Cl. ........................ 123/458; 123/494; 73/119 A
[58] Field of Search .................................... 123/456, 457, 123/458, 494; 73/119 A

[56] References Cited

U.S. PATENT DOCUMENTS

| | | | |
|---|---|---|---|
| 4,928,655 | 5/1990 | Kako | 123/494 |
| 5,176,122 | 1/1993 | Ito | 123/478 |
| 5,402,760 | 4/1995 | Takeuchi et al. | 123/490 |
| 5,708,202 | 1/1998 | Augustin et al. | 73/119 A |
| 5,747,684 | 5/1998 | Pace et al. | 73/119 A |
| 5,773,716 | 6/1998 | Antonioli et al. | 73/119 A |
| 5,895,844 | 4/1999 | Krueger | 73/119 A |

FOREIGN PATENT DOCUMENTS 0 570 986 A2 of 1993 European Pat. Off. .
0 651 150 A2 of 1994 European Pat. Off. .

*Primary Examiner*—Thomas N. Moulis
*Attorney, Agent, or Firm*—Evenson, McKeown, Edwards & Lenahan, P.L.L.C.

[57] ABSTRACT

In a process for determining the opening time of an injection valve of a common-rail injection system, an injection duration is derived from a characteristic diagram based on the fuel quantity to be injected and the static pressure in the common rail. For reading in the characteristic diagram, the value of the static pressure in the common rail is corrected by an amount obtained from the compressional vibration of the fuel as a function of its compressibility, the injected fuel quantity during at least one preceding injection operation, and the time between the at least one preceding injection operation and the current injection operation.

13 Claims, 3 Drawing Sheets

PROCESS FOR DETERMINING THE OPENING TIME OF AN INJECTION VALVE OF A COMMON-RAIL INJECTION SYSTEM

BACKGROUND AND SUMMARY OF THE INVENTION

The present invention relates to a process for determining the opening time of an injection valve of a common-rail injection system of the generic type in which the injection duration is determined from a characteristic diagram based on the fuel quantity to be injected and the static pressure in the common rail.

Common-rail injection systems of this type are generally known. European Patent Document EP 0 570 986 A2 discloses a system in which the injection operation is divided into two parts, so-called "pilot" and "main" injections. The opening time of the injection valve determined for conveying a defined quantity of fuel is distributed between the pilot injection and to the main injection. Control of the injection valve in the main injection period takes into account the fact that a remaining magnetic field from the pilot injection period still exists in the electromagnetic injection valve so that the controlling duration of the injection valve must be reduced correspondingly to convey the fuel quantity in the main injection period. The degree of such reduction is directly proportional to the duration of the pilot injection period and inversely proportional to the time interval of the pilot injection period and the main injection period. According to the statements in this published patent application, this approach also eliminates undesirable effects of compressional vibrations.

In the fuel injection process according to the invention, for the purpose of, reading values from a characteristic diagram, the value of the static pressure in the common rail is corrected by an amount which is determined from the vibration behavior of the fuel as a function of its compressibility, the quantity f fuel removed or the controlling duration of the injection valve during at least one preceding injection operation, and the time between at least one preceding injection operation and the actual injection operation.

The invention is advantageous with respect to the known state of the art in that the opening duration of the injection valve is better adapted to the variable pressure. That is, due to pressure fluctuations, the pressure will first fall and then rise, fluctuating beyond the value of the static pressure in the common-rail system. Thus, in order to be able to decide appropriately whether the opening time of the injection valve must be shortened or extended relative to the opening time which is appropriate in the case of static pressure in the common-rail system, the momentary time value of the pressure must be determined taking into account the compressional fluctuations. In this case, the time variation of the compressional vibrations shows in particular that, because of the reduction of the fuel quantity in the common rail system, there is first a lowering of the pressure. Thus, if the next injection operation follows so soon after the preceding injection that the pressure has not yet risen to exceed the static pressure value in the common rail, the opening time of the injection valve must be extended. In this manner, control of the injected fuel quantity relative to the demanded fuel quantity can be improved and the combustion operation optimized particularly with respect to fuel consumption and pollutant emissions.

In another embodiment of the invention the time variation of a compressional vibration is determined by at least a value which represents the compressibility of the fuel. In an idealized model, the compressional vibration can be represented as a vibration with a single frequency. However, in practice, it has been found that the vibration represents the superimposition of several vibrations of different frequencies.

The time variation of the vibration is therefore stored in a characteristic diagram, as a function of the fuel compressibility.

Thus, differences in the course of the pressure can advantageously be taken into account as a function of certain parameters, such as the fuel temperature. The compressibility of the fuel decisively determines the time variation of the compressional vibration.

In another embodiment of the invention, the at least one value which represents the compressibility is the speed of sound of the fuel, the modulus of elasticity of the fuel and/or the density of the fuel. Advantageously, it has been found that the compressibility of the fuel can easily be determined by means of comparatively easily accessible parameters.

In still another embodiment of the invention, the at least one value is determined by means of the static rail pressure and/or of the fuel temperature. As the result, the most important influences of the compressibility of the fuel can easily be taken into account.

In yet another embodiment, the phase position or a standardized value of the pressure deviation at the start of an injection operation is determined from the time period between at least one preceding injection operation and current injection which is to be carried out. In this case, it has been found that, with a separation of the two parameters describing the vibrations (amplitude—that is, maximal deflection—on the one hand, and the frequency or superimposition of several frequencies which determine the time variation of the compressional vibration on the other hand), the vibration can be stored in characteristic diagrams at acceptable expenditures. As a result, it is possible to represent numerically the compressional vibration, particularly with respect to the relevant values in real time. That is, the amplitude of the compressional vibrations on the one hand, and the vibration duration or a corresponding value from the superimposition of several vibration durations, are determined.

In still another embodiment of the invention, the amplitude of the compressional vibration, or a factor by which the standardized value of the pressure deviation is multiplied, is derived from the injected fuel quantity during at least one preceding injection operation. It has been found that, as a result, the amplitude or the factor can easily be determined by way of a corresponding characteristic curve.

In a further embodiment, the fuel quantity injected during at least one preceding injection operation is determined from the controlling duration of the valve during the at least one preceding injection operation. In this manner, the fuel quantity can easily be determined from available data.

In still another embodiment, either the amplitude or the factor is determined by means of at least one value which represents compressibility of the fuel. As a result, different environmental conditions and their influence on the compressional vibrations can be taken into account.

According to another feature of the invention, the at least one value is the speed of sound in the fuel or the modulus of elasticity or density of the fuel. These values are easily available, so that the compressibility is easy to determine.

Finally, in yet another embodiment, the value of the pressure is determined from the amplitude and phase position or the standardized value of the pressure deviation and the factor. This value of the pressure is added to the rail pressure to form a summation pressure, and the opening time of the injection valve is determined from the characteristic diagram. This summation pressure (as the common-rail pressure) and the demanded fuel quantity form the input quantities. In this manner, it has been found that compressional vibrations can be taken into account by means of previous injection operations at comparatively low expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
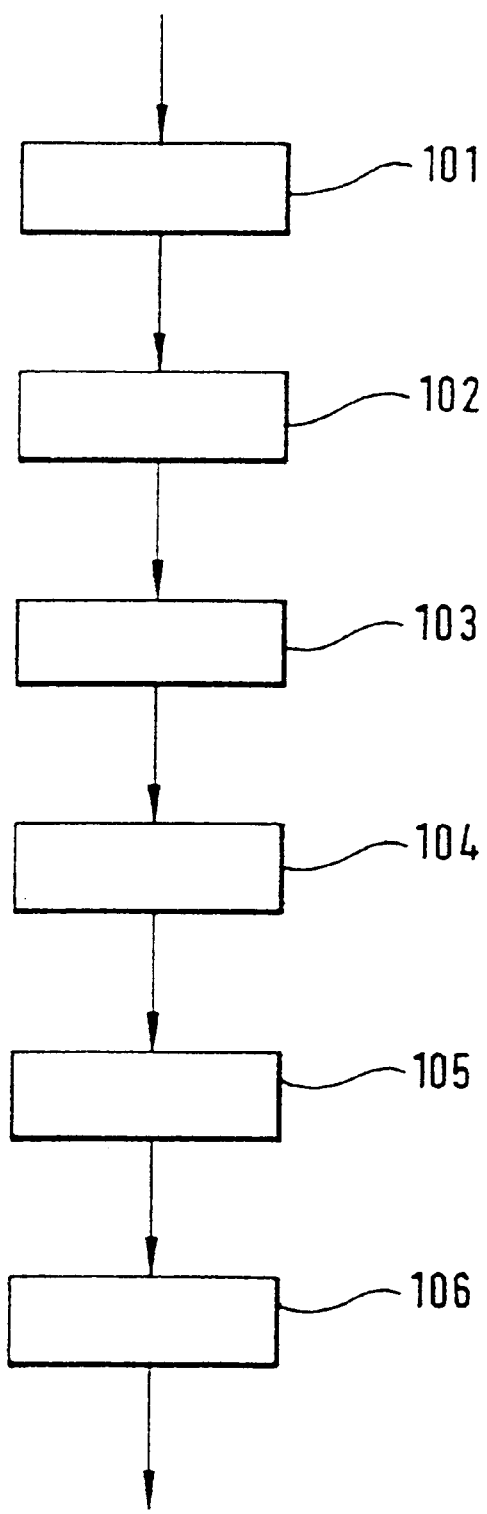
FIG. 1 is a view of an embodiment of a process for determining a corrected value of the pressure.

FIG. 1 illustrates an embodiment of the process according to the invention, which may be implemented in the form of a computer program to be executed by a microprocessor. The process according to the invention will then take place before each injection operation in order to obtain a corrected opening (fuel injection) time and, as the result, a corrected controlling period of the injection valve.

First, in step 101 a value B is obtained which is indicative of the compressibility of the fuel. This value may, for example, be the known speed of sound of the fuel or its modulus of elasticity or density, or a combination of these values. Advantageously, the value B is determined in a known manner, as a function of the pressure and temperature in the common-rail system. Since both of these values influence the compressibility of the fuel, it has proven advantageous to take them into account.

In step 102, the time variation of the compressional fluctuation is determined, from the value B in step 101 obtained. (This time variation of the compressional vibration is based on a standardized amplitude. The amplitude which is actually obtained as the result of the present conditions is taken into account in subsequent process steps.)

Figure 3:
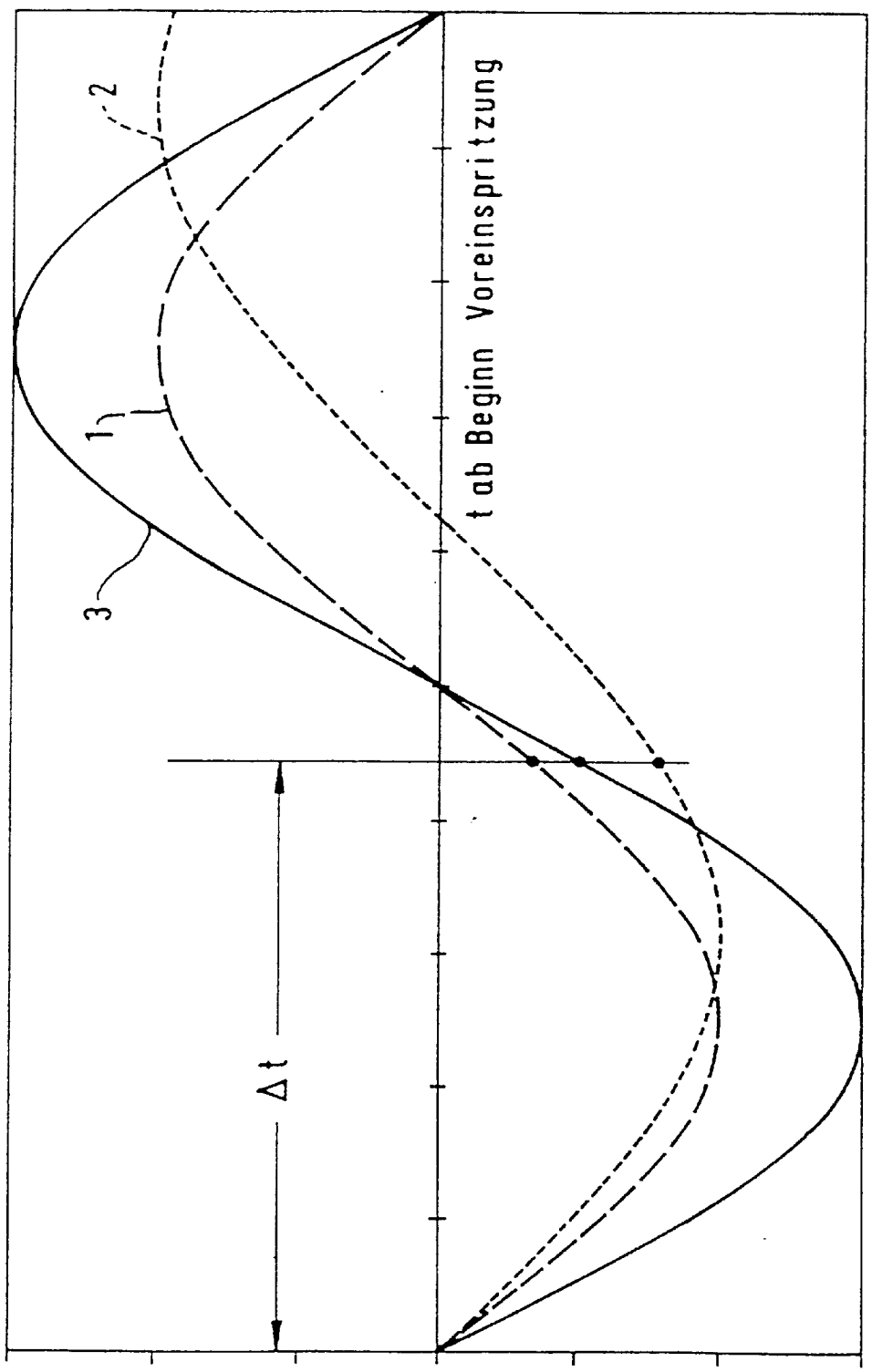
FIG. 3 shows the manner of determining a value for correcting the pressure according to the invention.

As a model, the time variation can be assumed to follow a sinusoidal vibration, with an initially negative fluctuation which starts at the beginning of an injection operation, as shown in FIG. 3. Thus, to determine the time variation, the time period of the sinusoidal vibration must be determined from the value B obtained in step 101. For this purpose, the time period can, for example, be represented by a stored characteristic curve which is stored with a sufficient number of supporting points.

In step 103, the phase position of the compressional vibrations at the actual point in time is then determined as a function of the elapsed time $\Delta t$ since the start of the last injection operation, and the time period thus determined.

Figure 2:
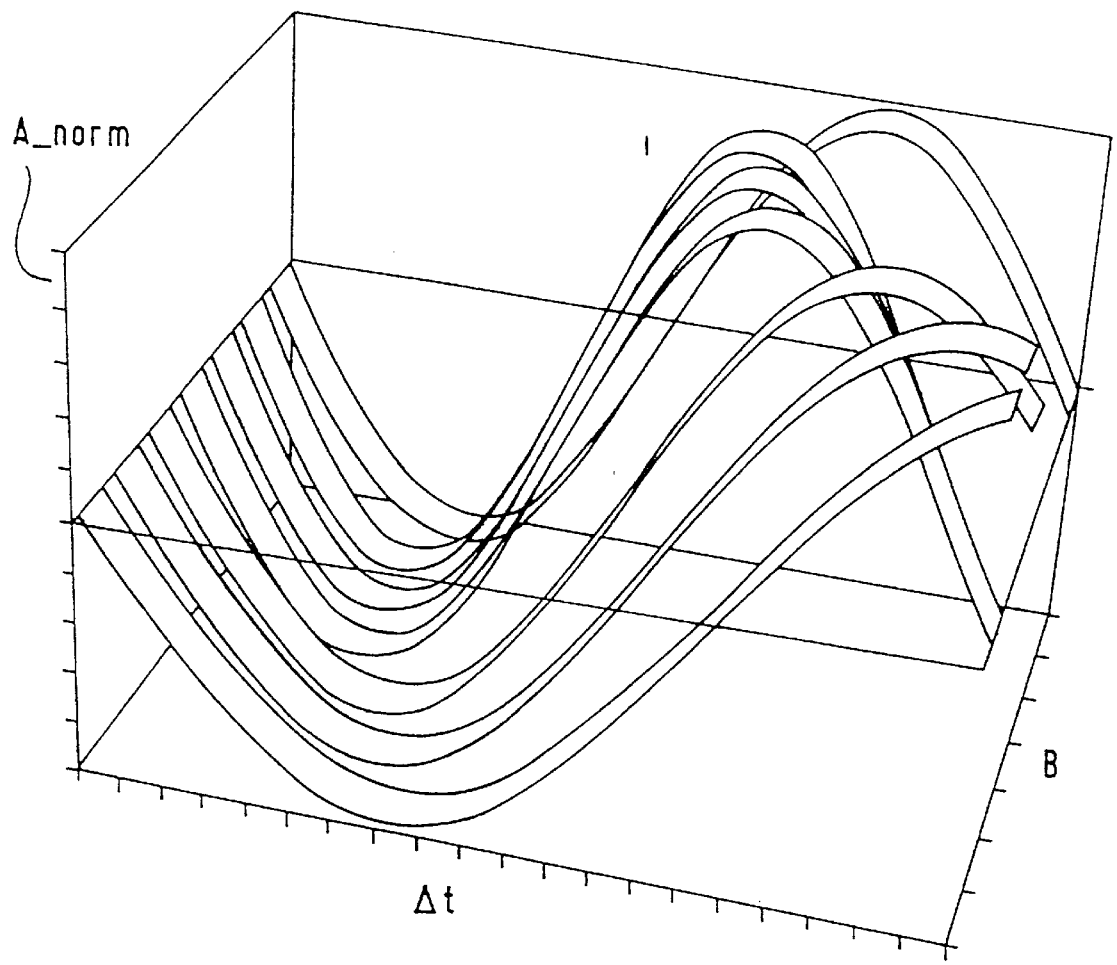
FIG. 2 depicts a three dimensional characteristic diagram for compressional variation as a function of the value B describing the compressibility of the fuel and of the time difference $\Delta t$ since the start of the last injection operation.

In practice, the compressional vibration will be represented as a superimposition of several vibrations with different frequencies. The standardized course of this compressional vibration is stored in a three-dimensional characteristic diagram (FIG. 2) as a function of elapsed time $\Delta t$ and of the value B determined in step 101. A standardized value of the pressure deviation can thus be read out of the characteristic diagram as a function of the time $\Delta t$ since the start of the last injection operation and the determined value B. An embodiment of such a characteristic diagram is illustrated in FIG. 2 in which the standardized amplitude $A\_norm$, the determined value B and the time $\Delta t$ establish a three-dimensional characteristic diagram. This characteristic diagram can be stored with as many supporting points as possible so that an analysis can be carried out with sufficient precision. In this case, the reading of the standardized pressure deviation corresponds to steps 102 and 103.

In step 104, in turn, a value is determined which represents the compressibility of the fuel. This value may, for example, be the speed of sound in the fuel, the modulus of elasticity, the density of the fuel or a combination of these values. The value determined in this step 104 may be the same value as that of step 101. The compressibility influences not only the time variation of the vibration but also the amplitude. Advantageously, this value is, in turn, determined as a function of the pressure in the common-rail system and/or of the temperature.

In step 105, an amplitude is determined, or a factor is determined for the value determined in step 104, by means of which the standardized value of the pressure deviation is multiplied. In this case, the amplitude and the factor can be stored in a characteristic diagram as a function of the defined value.

In addition to the value determined in step 104, the amplitude and the factor can also determined by means of the fuel quantity injected during the last injection, which substantially determines the amplitude and the factor. The fuel quantity can, for example, be derived on the basis of the opening duration of the last injection operation. It is also possible to take the value of the fuel quantity demanded during the last injection operation as the fuel quantity which was injected during the last injection operation.

In step 106, the value of the pressure is determined from the amplitude and the phase position of the pressure variation, based on the course of the sinusoidal vibration, and is added to the static system pressure in the common-rail system. If the compressional vibration consists of a superimposition of several frequencies and, for this reason, in steps 102 and 103 a standardized value of the pressure deviation was determined from a characteristic diagram, this standardized value of the pressure deviation is in step 106 multiplied corresponding to the factor determined in step 105 in order to determine the value of the pressure which is added to the static pressure in the common-rail system.

FIG. 3 shows an example which illustrates the process according to the invention, for the determination of the value of the pressure by which the pressure is corrected in the common-rail system. First, the time period of the compressional vibration is determined. As an example, two differently standardized compressional vibrations 1 and 2 are illustrated here. The compressional vibration 1 has the determined time period. Furthermore, the amplitude of the compressional vibration or a factor is also taken into account by means of which the standardized value of the compressional vibration is multiplied. The illustrated compressional vibration 3 corresponds to the compressional vibration 1 taking into account the amplitude and the factor. The corresponding value on the curve 3 is therefore the value of the pressure by which the value in the common-rail system must be corrected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for determining an opening time of an injection valve of a common-rail injection system of the type in which injection duration is determined from a characteristic diagram as a function of fuel quantity to be injected and the pressure in the common rail said process comprising:

for the reading in the characteristic diagram, correcting a value of the static pressure in the common rail a defined amount which is obtained from time varying vibration behavior of the fuel as a function of its compressibility;

one of fuel quantity injected and control duration of the injection value during at least one preceding injection operation; and time between at least one preceding injection operation and the current injection operation.

2. Process according to claim 1, wherein time variation of a compressional vibration is determined as a function of at least one value which determines compressibility of the fuel.

3. Process according to claim 2 wherein the at least one value is one of the speed of sound in the fuel, the modulus of elasticity of the fuel and density of the fuel.

4. Process according to claim 2 wherein the at least one value is determined as a function of at least one of static rail pressure and fuel temperature.

5. Process according to claim 3 wherein the at least one value is determined as a function of at least one of static rail pressure and fuel temperature.

6. Process according to claim 2 wherein one of phase position or a standardized value of the pressure deviation at the start of a current injection is determined from an elapsed time period between the at least one preceding injection and the current injection.

7. Process according to claim 4 wherein one of phase position or a standardized value of the pressure deviation at the start of a current injection is determined from an elapsed time period between the at least one preceding injection and the current injection.

8. Process according claim 1 wherein one of an amplitude of compressional vibration and a factor with which a standardized value of pressure deviation is to be multiplied is determined as a function of one of a fuel quantity injected during at least one preceding injection and a controlling duration of the injection valve.

9. Process according claim 6 wherein one of an amplitude of compressional vibration and a factor with which a standardized value of pressure deviation is to be multiplied is determined as a function of one of a fuel quantity injected during at least one preceding injection and a controlling duration of the injection valve.

10. Process according claim 6, wherein a fuel quantity injected during at least one preceding injection is derived from a controlling duration of an injector valve during the at least one preceding injection.

11. Process according to claim 8, wherein the amplitude or the factor is determined by means of at least one value which represents compressibility of the fuel.

12. Process according to claim 11, wherein the at least one value is at least one of speed of sound in the fuel, a modulus of elasticity of the fuel and density of the fuel.

13. Process according to claim 6 wherein a pressure value is determined from one of the amplitude and the phase position, the standardized value of the pressure deviation and the factor, said pressure value being added to rail pressure to form a summation pressure; and opening time of the injection valve is determined from a characteristic diagram based on said summation pressure and a demanded fuel quantity.

* * * * *